United States Patent [19]

Hollins

[11] 4,071,839
[45] Jan. 31, 1978

[54] MOTOR VEHICLE AIR CONDITIONER CONTROL AND WARNING SYSTEM

[76] Inventor: Jesse R. Hollins, 40 Stoner Ave., Great Neck, N.Y. 11021

[21] Appl. No.: 690,679

[22] Filed: May 27, 1976

[51] Int. Cl.[2] .............................................. F01P 5/14
[52] U.S. Cl. ....................... 340/53; 62/323; 123/41.15; 307/10 R; 340/57
[58] Field of Search .......... 340/52 R, 57, 53; 307/10 R; 123/41.01, 41.15; 62/125, 126, 129, 243, 323

[56] References Cited

U.S. PATENT DOCUMENTS

| 2,810,269 | 10/1957 | Schjolin | 62/129 |
| 3,597,661 | 8/1971 | Isaacs | 317/135 |
| 3,702,064 | 11/1972 | Ciollo | 62/158 |
| 3,904,885 | 9/1975 | Hollins | 307/10 R |

Primary Examiner—John W. Caldwell, Sr.
Assistant Examiner—Joseph E. Nowicki

Attorney, Agent, or Firm—Kirschstein, Kirschstein, Ottinger, Frank & Cobrin

[57] ABSTRACT

A system for concomitantly shutting off a motor vehicle air conditioner compressor and lighting a warning light, when the engine of the vehicle overheats, and for concomitantly allowing operation of the air conditioning unit and shutting off the warning light when the engine is at normal operating temperature. The system features a two-position electrical switch such as a solenoid or relay which is electrically connected to a heat sensitive switch immersed in the liquid cooling medium of the engine. The heat sensitive switch has two states, depending on the temperature of the liquid cooling medium. In one state, i.e. when the liquid cooling medium temperature is normal, the two-position electrical switch is in a first position, and the electrically controlled clutch of the air conditioner compressor is closed and the warning light is not lit. In the other state, the two-position electrical switch is in a second position and the clutch is open, and the warning light is lit.

7 Claims, 3 Drawing Figures

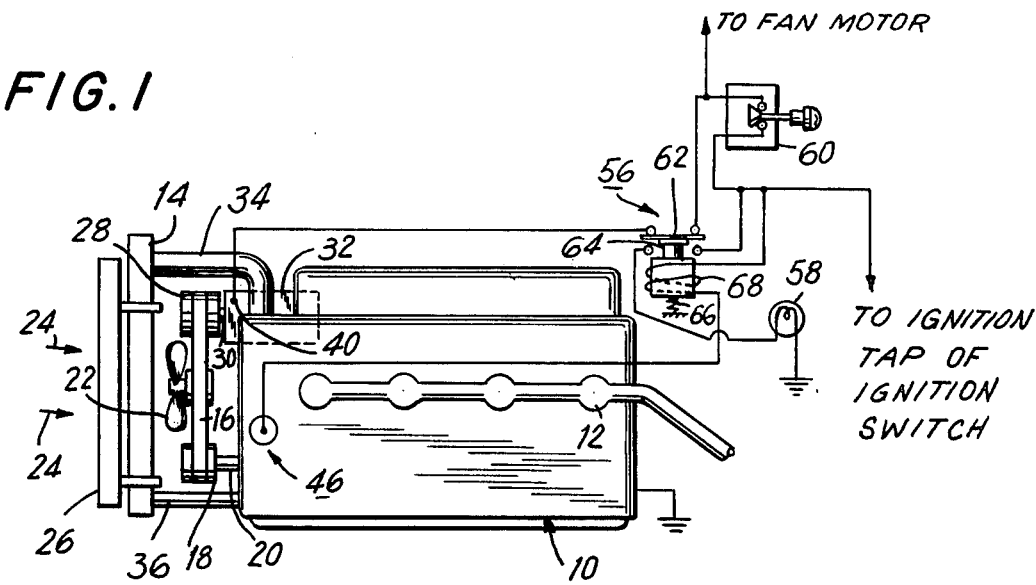
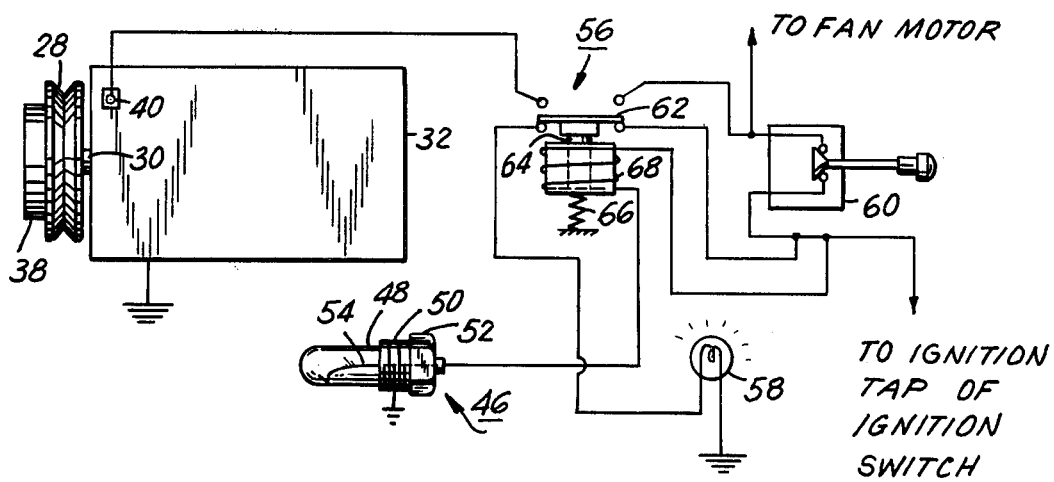
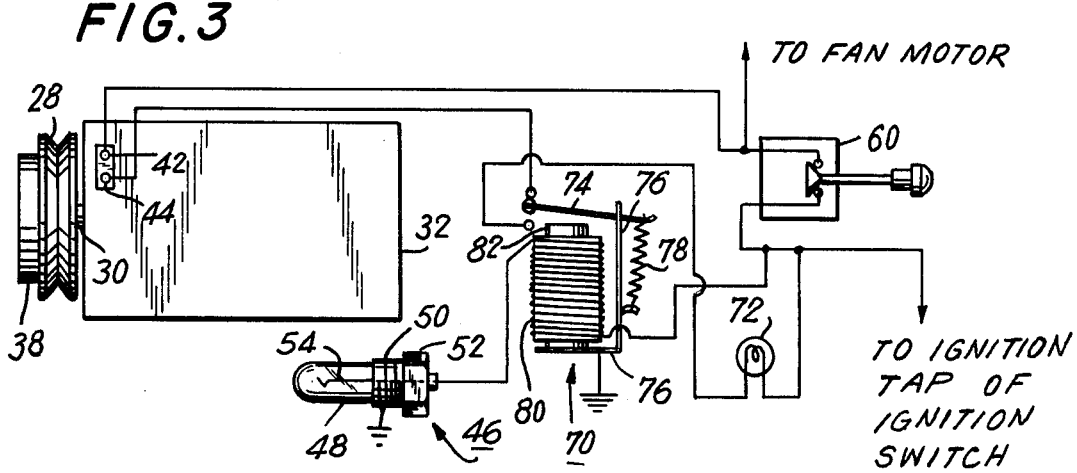

MOTOR VEHICLE AIR CONDITIONER CONTROL AND WARNING SYSTEM

BACKGROUND OF THE INVENTION

1. Field of the Invention

A warning and control system for motor vehicle air conditioners.

2. Description of the Prior Art

Most motor vehicle internal combustion engines are cooled by means of a cooling liquid which is usually an aqueous solution containing a dissolved anti-freeze chemical such as ethylene glycol (permanent type) or methanol, and which circulates through the engine block and through a radiator. The radiator is located in front of an air fan disposed at the front of the engine block and driven by a belt mounted on a crankshaft pulley. As the engine crankshaft turns and especially when the vehicle is in motion, air is sucked inwards through the radiator and towards the engine by the fan, which air is initially at generally ambient temperature. The air, when directed through the fins of the radiator, cools the cooling liquid which is in constant circulation in series through the radiator and engine block as long as the engine is running. Thus, heat is transferred via the liquid cooling medium from the engine block (where gasoline combustion is taking place) to the air, and as a result, the engine block is cooled and not allowed to overheat.

The usual motor vehicle engine cooling system includes a pressure release safety valve, which opens to alleviate excessive pressure generated when the temperature of the cooling system liquid exceeds a predetermined level. The safety valve is provided because if the radiator is not properly cooling the cooling liquid, the temperature of the cooling liquid rises to inordinate levels and eventually a portion of the cooling liquid is converted to steam and/or vaporized antifreeze, with corresponding increases in pressure which could blow out gaskets and hoses, or rupture the hoses or even rupture the radiator. Thus, to prevent damage to the appurtenances of the engine, the pressure relief valve opens and safely discharges fluid from the cooling system, so that the pressure in the cooling system cannot exceed a safe level.

When overheating does occur, the steam and antifreeze vapor created by excessive heating of the cooling liquid eventually builds up to a pressure at which the pressure relief valve opens. The steam and/or antifreeze vapor thus escapes, and consequently some of the cooling liquid is lost. The overheating, being signalled by a warning light on the dashboard, which light is electrically connected to a heat sensitive switch that is mounted into the engine block or water pump, requires the motor vehicle driver to stop the motor vehicle and shut off the engine, raise the hood, or take other steps to allow the engine to cool. Then, before the engine of the motor vehicle can be again operated, it is usually necessary to add more cooling liquid from an external source, i.e. to supplement the body of residual cooling liquid in the engine with a fresh make-up supply. Very frequently, when the cooling system of a motor vehicle such as an automobile, bus or truck becomes overheated in summertime, a substantial amount of cooling liquid which may contain valuable antifreeze and antirust components is lost, and there is insufficient cooling liquid in the system, after the engine is cooled, to properly cool the engine. Thus, there is a three-fold problem with an overheated motor vehicle engine. First, it requires the need to shut off the engine. Second, it can lead to damage to the engine, especially if the pressure relief valve does not operate properly. Third, costly antifreeze and other components of the cooling liquid medium are lost and must be replaced, for safe wintertime operation. Recent advances in cooling system technology entail the provision of costly but effective packaged liquid coolant formulations which are not blended with water but instead are intended to be used per se at full strength.

The air conditioning of motor vehicles, especially of automobiles, trucks and buses, is much in demand by consumers and travelers, and many of them are factory equipped with an air conditioning system of well known design, which usually includes, inter alia, a compressor and a condenser. A control system for a motor vehicle air conditioner is described in my U.S. Pat. No. 3,904,885. The condenser is air-cooled by ambient air, and is usually located in front of the engine radiator. When the air conditioner is in service and the air conditioner compressor is operative, the refrigerant fluid such as a freon in the air conditioning system becomes heated, due to its function of absorbing heat from the interior body compartment of the motor vehicle, and consequently the temperature of the freon or other refrigerant fluid in the condenser increases. Therefore, the temperature of the cooling air passing in series through the fins of the condenser and the radiator rises, and instead of receiving ambient air as is the case when the air conditioning sytem is not functioning, the radiator receives preheated air. In other words, when the air conditioner compressor is running, the temperature of the condenser increases and thus the temperature of the cooling air increases from ambient as the cooling air flows through the condenser fins. Thus, the air, which is subsequently directed through the radiator fins, is preheated thus it cannot function efficiently as a cooling agent.

The operation of an air conditioning unit in a motor vehicle does not entail serious overheating problems when the motor vehicle is moving at a reasonable velocity, and large volumes of ambient air flow through the condenser fins, since the air temperature rise is minimized since the rate of heat removal is fairly constant. However, at low motor vehicle speeds and in hot weather, an overheating problem may be created relative to the motor vehicle engine in vehicles equipped with an air conditioner system, especially when the vehicle is traveling at a slow velocity or with stop-and-go driving, which generates heat in the engine at a very high rate since the inertia of the stopped vehicle must be overcome by the engine to place the vehicle in motion. This is commonly encountered in summertime traffic jams, in urban centers, or when a traffic stoppage occurs due to an accident or the like. What happens is that the air flowing through the condenser fins is heated, so that this heated air is directed through the radiator fins at an initially elevated temperature, and satisfactory heat dissipation from the cooling medium within the radiator cannot occur because of a relatively low temperature driving force ($\Delta T$) for heat transfer. Another adverse factor when the motor vehicle is not moving at substantial velocities is that there is a relatively reduced volumetric flow rate of air flowing through the radiator fins at slow motor vehicle velocities. Thus, the problem becomes compounded and overheating of the motor vehicle cooling system occurs. A factor in alleviating this overheating would be the temporary interruption of the operation of the air conditioner system, in particular the compressor, since this would lead to the provision of ambient rather than preheated air through the radiator fins.

SUMMARY OF THE INVENTION

1. Purposes of the Invention

It is an object of the present invention to provide an improved motor vehicle air conditioner warning and control system.

Another object is to provide such a system in which two functions take place concomitantly, i.e. the warning light and the air conditioner compressor functions.

A further object is to provide such a system in which either the air conditioner compressor or a warning light is operative.

An additional object is to simultaneously modify two variables in such a system, i.e. the air conditioner compressor control function and the warning light function, by means of a single thermal sensing means.

These and other objects and advantages of the present invention will become evident from the description which follows.

2. Brief Description of the Invention

In the present invention, an improved motor vehicle air conditioner warning and control system has been devised which is applicable to a motor vehicle having a liquid cooled internal combustion engine and an air conditioning system which includes a compressor and an electrically controlled clutch for driving the compressor, as well as, in the usual configuration, a condenser in series and prior to the radiator of the cooling system in which a liquid medium is used to cool the internal combustion engine.

The system includes a two-position electrical switch. Within the context of the present invention, it will be understood that the term "electrical switch" encompasses and includes either a solenoid, or relay, or like devices in which the switch setting is changed by the imposition or termination of an electric current flow. A thermal sensing means consisting of a heat sensitive switch is connected to the two-position electrical switch. The heat sensitive switch is immersed in the liquid medium and has two states or settings, depending on temperature, i.e. the heat sensitive switch is in the first state, being open, when the temperature of the liquid medium is below a predetermined value, and in the second state, being closed, when the temperature of the liquid medium is above a predetermined value. An electrical warning light is also provided, which light is usually mounted on the dashboard of the motor vehicle so that it may readily be observed by the operator of the vehicle. The light and the electrically controlled clutch are associated with the two-position electrical switch so that when the heat sensitive switch is in the first state, the two-position electrical operated switch is in a first position, allowing the air conditioner compressor clutch to be electrically energized thus the clutch is closed; when the heat sensitive switch is in the second state, the two-position electrical switch is in a second position preventing the air conditioner clutch from being electrically energized at which time the warning light will be lit. What the two-position electrically operated switch does in effect is to simultaneously interrupt one electrical circuit and complete another electrical circuit, when the temperature of the liquid medium changes through a predetermined value. The heat sensitive switch is electrically connected to a coil of the two-position electrical operated switch, so that when the heat-sensitive switch is in closed circuit position, electric current will flow through the coil winding of said electric switch, and when the heat sensitive switch is on open circuit position no electricity can flow through the coil winding of the electric operated switch. This results in concomitant change in the circuit setting of the two-position electrical operated switch. The electrical circuit of the air conditioner compressor electric clutch may either be directly connected to ground, or may be electrically connected to ground through the two-position electrical switch when the switch is in the first position. In most instances, a manually-operated air conditioner control switch will be electrically connected to the clutch in such a manner that the electrically controlled clutch cannot be closed until the control switch is set in the closed or "operate" position by manual adjustment.

The total installation of the system during prime or factory installation on a new motor vehicle will now be described. The manual control switch for the air conditioner compressor electric clutch and the air conditioner air circulating fan motor is fixed to or in the instrument panel or dashboard of the vehicle. The air conditioner compressor unit, including the electric clutch assembly, is attached to the engine block of the vehicle, and arranged to be driven by a belt, which belt is driven by rotation of the crankshaft of the engine, when the engine is in operation. The thermal unit or engine coolant fluid heat sensing element and housing is screwed into a threaded port in the engine block or water pump housing, as may be provided by the vehicle manufacturer to receive the thermal unit. Since the invention basically entails the electrical components and their wiring, details of other and standard components of the air conditioning system such as the condenser, the cold chamber, piping, valves etc. is omitted in the interest of brevity.

In addition to the above outlined units, which are the basic units of the air conditioner system, an additional unit is added, namely a two-position electrical switch, which may be either a solenoid, a relay or the like, depending on a particular installation. The specific solenoid or relay is usually installed in the engine compartment of the vehicle. This specific solenoid or relay, i.e. two-position electrical switch, is an integral part of the invention, since it is a necessary prerequisite to the creation of the necessary electrical circuitry for the automatic energizing of the electric clutch of the air conditioner compressor, or the automatic de-energizing of the electric clutch, thereby causing the compressor to function or not to function, depending entirely upon the operation or non-operation of the electric switch, provided that the air conditioner manual control switch is in closed circuit position to allow the air conditioner compressor to operate, if the coolant fluid of the engine is at a normal or below normal temperature range.

With regard to the wiring of the electric coil of the electric operated switch, a wire is connected either directly or indirectly, between the ignition tap of the ignition switch and one end of the electric coil of the electric operated switch. A wire is connected between the other end of the electric coil of the electric operated switch and the electrical connection of the thermal sensing unit. Within this thermal sensing unit is mounted a bimetallic strip or the like, which strip extends to the electrical connection of the unit. The strip has two states, depending on the level of temperature sensed. In one state, typically when the temperature being sensed is normal, the strip is spaced from the grounded housing of the unit so that the electrical circuit is open. In the other state, typically when the temperature being sensed is sufficiently above normal, the free end of the strip is in contact with the housing, thereby allowing electric current to flow through said closed thermal switch to ground.

With regard to the wiring of the electric clutch of the air conditioner compressor, a wire is connected, either directly or indirectly, between the ignition tap of the ignition switch and a contact tap of the air conditioner manual control switch. A wire is connected between the other contact tap of the air conditioner manual control switch and one contact tap of the two normally closed contacts of a solenoid unit. A wire is connected between the other contact tap of the two normally closed contacts of the solenoid unit and the electrical connection of the electric winding of the electric clutch of the air conditioner compressor. In this embodiment of the invention using a solenoid, the electric clutch will have only one wire connection, since the electrical system of the electric clutch unit is internally grounded to the compressor housing, hence when the compressor is mounted on the engine block, the engine block being always grounded in motor vehicle engines, the electric system of the electric clutch is grounded.

With regard to the wiring of the warning light bulb, a wire is connected between the ignition tap of the ignition switch and one of the two normally open contact taps of the solenoid. A wire is connected between the other normally open contact tap of the solenoid to one leg of the bulb filament. The other leg of the bulb filament is connected, either directly or indirectly, to ground.

When the coolant fluid of the engine is at normal or below normal operating temperature, the solenoid is de-energized because the thermal element of the thermal sensing unit is on open circuit, thus the circuit through the solenoid to the electric clutch of the air conditioner compressor is closed, hence the air conditioner compressor can operate if the compressor manual switch and the ignition switch are in closed circuit operating position. When the coolant fluid of the engine is heated above normal operating temperature range, the thermal element e.g. bimetallic strip of the thermal sensing unit will abut or otherwise contact the grounded thermal unit housing, and will be in closed circuit operating position, thus creating a closed circuit through the solenoid coil to ground, and the solenoid coil will be energized. Consequently, the solenoid will magnetically attract its core causing the normally closed contacts of the solenoid to open, thus the circuit to the electric clutch of the air conditioner compressor will be opened, hence the compressor will cease functioning. In addition, the normally open contacts of the solenoid will become closed and the circuit to the bulb filament of the warning light bulb will be closed, hence the warning light bulb will light up. Thus, two functions of the system are sequentially accomplished with a single thermal sensing unit and a single solenoid.

When a relay is employed in the system, the relay will embody a coil, and an armature having contact members or taps. In addition, the relay will have two independent contacts, i.e. an upper contact and a lower contact. When the relay coil is de-energized, the relay armature is in closed contact relation with the upper independent contact. When the relay coil is energized, the relay armature is in closed contact relation with the lower contact, because the relay armature is magnetically attracted towards the magnetic core of the relay about which the relay coil is wound.

Typically when using a relay, which may be preferred in some instances, the electric clutch of the air conditioner compressor is not internally grounded but instead the clutch has two electrical connections, i.e. taps, across which electric voltage potential is applied so that electric current flows when the clutch is to be operative in driving the air conditioner compressor. Thus with regard to the wiring of the electric clutch of the compressor in this embodiment of the invention, a wire is connected between the output tap of the air conditioner manual control switch and one tap of the electric clutch of the air conditioner compressor. A wire is connected between the other tap of the electric clutch and the upper contact of the relay. Since the relay armature is grounded, usually through the relay frame which is grounded onto the engine block or chassis of the motor vehicle, a complete electrical circuit through the electric clutch is established, provided that the ignition switch and the air conditioner manual control switch are in the closed or "on" position.

With regard to the wiring of the relay per se, a wire is connected, either directly or indirectly, between the ignition terminal of the ignition switch and one tap or end of the relay coil winding. A wire is connected between the other end of the relay coil winding and the electrical connection of the thermal sensing unit.

With regard to the wiring of the warning light when a relay is employed, the warning light bulb filament does not have a direct ground leg. Instead, a wire is connected, either directly or indirectly, between the ignition terminal of the ignition switch and one leg of the bulb filament. A wire is connected, either directly or indirectly, between the other leg of the bulb filament and the lower contact of the relay unit. The connections to the legs of the bulb filament will usually be by means of a conventional socket arrangement.

When the coolant fluid of the engine is at normal or below normal operating temperature, the relay is de-energized because the thermal element of the thermal sensing unit is on open circuit, and the circuit through the upper contact of the relay to the electric clutch of the air conditioner compressor is closed, hence the air conditioner compressor operates. When the coolant fluid of the engine is heated above normal operating temperature range, the bimetallic strip or other thermal element of the thermal sensing unit will abut or otherwise contact the grounded thermal unit housing, and will be in closed circuit operating position, thus creating a closed circuit through the relay coil to ground, and the relay coil will be energized. Consequently, the armature of the relay will move to a lower position opening the normally closed upper contact, and the circuit providing electric potential or voltage to the electric clutch of the air conditioner compressor will be opened, hence the compressor will cease functioning. In addition, the lower contact of the relay will close and the circuit supplying electric voltage potential to the warning light bulb filament will be closed, hence the warning light bulb will light up. Thus, two functions of the system are sequentially accomplished with a single thermal sensing unit and a single relay. By automatically shutting off the air conditioner compressor, the air conditioner condenser will cool, thus allowing cold or ambient air to be drawn past the engine's radiator core thereby cooling the coolant fluid of the engine. Once this has taken place, the thermal switch will go to open circuit, the solenoid or relay will become de-energized and the electric switch contacts bridging member will open the circuit of the warning light circuit thereby extinguishing the warning light, and said electric contacts bridging member has closed circuit to the air conditioner compressor clutch, thus allowing the air conditioner compressor to resume its operation.

The system of the present invention provides several salient advantages. As mentioned supra, the thermal sensing unit functions to govern and monitor two distinct electrical circuits, because of the operation of the thermal sensing unit in conjunction with the solenoid or relay unit. Thus, the electrical circuitry of an installation is greatly simplified and made less costly, since prior art designs inter alia necessitated the provision of two separate thermal sensing units and associated circuitry. The actuation of the warning light sequentially with the shutting down of the air conditioner compressor serves to indicate to the motor vehicle driver that not only is the engine overheated but also that the air conditioning unit has ceased functioning. In addition, this system of wiring allows the solenoid or relay to remain unenergized as long as the thermal unit is on open circuit as caused by the engine's coolant fluid operating in its normal operating temperature range.

The invention accordingly consists in the features of construction, combination of elements and arrangement of parts which will be exemplified in the system hereinafter described and of which the scope of application will be indicated in the appended claims.

BRIEF DESCRIPTION OF THE DRAWINGS

In the accompanying drawings in which are shown various possible embodiments of the invention:

FIG. 1 is a schematic illustration of an embodiment of the present invention;

FIG. 2 shows the FIG. 1 embodiment as modified when the engine overheats, and

FIG. 3 illustrates an alternative embodiment of the invention.

DETAILED DESCRIPTION OF THE PREFERRED EMBODIMENTS

FIG. 1 shows an internal combustion engine block 10 which is of any conventional type that is liquid cooled as contrasted to those engine designs where air cooling alone is relied on to directly cool the engine. The particular design of engine 10 is generally standard and conventional, i.e. that of known liquid cooled internal combustion engines regardless of design of engine. As shown, engine block 10 is grounded. The engine block 10 is provided with standard appurtenances including an exhaust manifold 12, a radiator 14, and a fanbelt 16, which belt 16 is driven by a pulley 18 mounted on the end of a crankshaft 20 of the engine 10. The belt 16 drives a fan 22 which draws air streams 24 through the fins of the radiator 14 after air streams 24 have first passed through the fins of an air conditioning system condenser 26 to be described infra, which is located slightly to the front of engine liquid cooling radiator 14. Belt 16 also drives a pulley 28 which rotates a shaft 30 extending to the electric clutch of an air conditioner compressor 32.

The radiator 14 is located in front of the fan 22, and liquid coolant flow tubes 34 and 36, which usually consist of hoses, serve to transfer liquid coolant between radiator 14 and engine block 10 via a water pump, not shown, which is usually pulleyed to belt 16.

The motor vehicle in which engine block 10 is mounted includes an air conditioning system having a condenser 26, and an air conditioner compressor 32 located within the engine compartment and mounted on the block 10. The pulley 28 which drives the compressor via shaft 30 is provided with an air conditioner compressor electrically controlled clutch 38 (FIGS. 2 and 3). When the clutch 38 is engaged, compressor 32 is run by the belt 16 driving pulley 28, and when clutch 38 is not engaged, rotation of pulley 28 does not result in rotation of shaft 30. The air conditioner compressor clutch 38 is engaged by the application of electrical voltage potential via an electrical control terminal 40 (FIGS. 1 and 2), with the compressor housing being grounded (FIG. 2), or the clutch 38 is engaged by the application of electrical voltage potential across two electrical control terminals 42 and 44 (FIG. 3). In either case, application of the voltage potential causes an electrical current to flow through an electrical winding creating a magnetic force in the clutch, which causes the electric clutch to engage, thereby transmitting driving power from the engine's rotating crankshaft to the air compressor, as is well known to those skilled in the art.

In FIGS. 1, 2 and 3 an electrical thermal sensing means 46 is provided, the housing 48 of means 46 being grounded to engine block 10. The housing 48 includes a screw fitting 50 having a head (wrench engaging part) 52 on the end thereof. Screw fitting 50 is threaded into a tapped opening in the engine block 10, so that the housing 48 is immersed in the engine cooling liquid. A terminal 54 generally consisting of a bimetallic strip or the like extends within the housing 48.

In accordance with the present invention, and referring to FIGS. 1 and 2, a solenoid 56 is provided, the warning light 58 shown is usually mounted on the dash within the vehicle and has one leg of the lamp filament grounded. FIG. 1 shows the system under normal operating conditions, with an air compressor manual control switch 60 being closed, and the solenoid 56 in normal operating position, i.e. the contact plate 62 of solenoid 56, which plate is mounted on core 64 of the solenoid 56, being in an upper position by virtue of the upwards force exerted by a spring 66 of the solenoid 56. Plate 62 thus completes a circuit from an ignition tap of the ignition switch, through the switch 60, to terminal 40, so that the clutch 38 is engaged and the air compressor 32 is operating. Warning light 58 is not lit in FIG. 1 since the circuit to the lamp filament is open.

FIG. 2 shows the system when the engine block liquid coolant has become overheated above normal operating temperature range, with the internal contact 54 of thermal sensing unit 46 deforming and abutting the housing 48 to close an electrical circuit through a coil 68 of the solenoid 56. This has resulted, in FIG. 2, in causing a magnetic field to be generated which has moved core 64 downwards so that plate 62 now has opened the circuit to the electric clutch 38 of the air conditioner compressor electrical contact terminal 40, and has closed a circuit from the ignition tap of the ignition switch to the filament of lamp 58 and on to ground, thus the lamp 58 is lit, indicating to the operator of the motor vehicle that the engine is overheated and that the air conditioner is not operating.

In FIG. 3 the thermal sensing unit 46 is shown under normal operating conditions, i.e. with the engine liquid coolant at a normal temperature and element 54 spaced from housing 48. This configuration of unit 46 is comparable to the unit 46 configuration in FIG. 1. In accordance with the FIG. 3 embodiment of the invention, a relay 70 is provided, together with a warning light 72 neither leg of which is directly grounded. FIG. 3 shows the alternative system under normal operating conditions, with the control switch 60 being closed, and the relay 70 in normal operating position, i.e. an armature 74 of relay 70, which armature 74 is mounted on frame 76 of the relay 70, being in an upper position by virtue of the leverage exerted by a spring 78 of the relay 70. Armature 74 thus completes a circuit from an ignition tap of the ignition switch, through the switch 60, to terminal 42, through the electrical control circuit of the clutch to terminal 44, to armature 74, and thence to ground via frame 76, so that the electric clutch 38 is engaged and the compressor 32 is operating. Warning light 72 is not lit in FIG. 3 since the circuit to the lamp filament is open.

When the thermal sensing means 46 of FIG. 3 senses an overheated condition of the liquid engine coolant, by virtue of element 54 deforming downwards to abut housing 48 which is grounded via threaded fitting 50, an electrical circuit will be completed through a coil 80 of the relay 70, so that a magnetic field will be generated through a core 82 of relay 70 which will pull armature 74 downwards so that armature 74 will open the air conditioner electric circuit and interrupt the application of electrical voltage potential across terminals 42 and 44, so that the air conditioner electric clutch will disengage and the compressor will cease operating. Concomitantly, a circuit will be closed from the ignition tap of the ignition switch, through the filament of lamp 72, through armature 74 and frame 76 to ground, and the lamp 72 will light up, indicating to the operator of the motor vehicle that the engine is overheated and that the air conditioner is not operating.

To summarize the air conditioner operation aspect of the invention, if it is desired to have the air conditioner system operational, switch 60 is closed and if the temperature of the cooling fluid is below overheat temperature levels, the thermal sensing means 46 is open, so that electric clutch 38 is closed. As a consequence, the air conditioning system is operational. Continued operation of the air conditioning system results in condenser 26 emitting heat. The air streams 24 which are directed through the fins of condenser 26 and through the radiator 14 fins cools the liquid coolant. If the vehicle is moving at a very low speed or is stationary, there is a minimum amount of air which is drawn by fan 22 through condenser fins and radiator fins. The temperature of the air is elevated as a result of the continued operation of the condenser so that liquid cooling radiator 14 is not completely effective in cooling the cooling liquid. Consequently, the temperature of the engine cooling liquid is increased and, if said temperature reaches the predetermined overheat level, thermal sensing means 46 closes allowing electric current to flow through electric coil of the electric switch thereby breaking the electric circuit to the electric clutch 38. Thus it is no longer electrically energized and the operation of the compressor is halted. As a result, condenser 26 cools and the air which is directed through the fins of condenser 26 and through the liquid cooling fins of radiator 14 is not heated so that said radiator can efficiently cool the cooling liquid. As a consequence, the temperature of the cooling liquid decreases and falls below the predetermined level so that thermal sensing means 46 opens again. When this occurs, the electric coil of the electric switch is de-energized and said switch returns to its normal closed circuit condition, thus the electric clutch winding of the electric clutch of the air conditioner compressor and the air conditioning system again becomes operational. At that time the warning light remains unlit. It should be noted that when the vehicle is moving at a relatively high rate of speed, as discussed supra considerable quantities of air are directed through the condenser fins and to the liquid cooling radiator fins, so that the operation of the air conditioner system has little or no effect insofar as heating the cooling liquid circulating through the engine cooling system is concerned, and the air conditioner system remains operational under these conditions and warning light 58 or 72 remains unlit i.e. the light 58 or 72 never lights up under normal operating conditions.

As various possible embodiments might be made of the above invention, and as various changes might be made in the embodiments above set forth, it is to be understood that all matter herein described or shown in the accompanying drawings is to be interpreted as illustrative and not in a limiting sense.

It thus will be seen that there is provided a motor vehicle air conditioner warning and control system which achieves the various objects of the invention and which is well adapted to meet the conditions of practical use.

Having thus described the invention, there is claimed as new and desired to be secured by Letters Patent:

1. A motor vehicle air conditioner control and warning system comprising a liquid cooled internal combustion engine, an ignition switch for turning on and shutting off said engine, said liquid cooled internal combustion engine including a cooling system in which a liquid medium is used to cool the internal combustion engine, a motor vehicle air conditioning system, said motor vehicle air conditioning system including a compressor, a manually operated control switch and an electrically operated clutch for driving said compressor, a two-position electrical switch, said electric clutch of the compressor being series connected to a first contact of said two-position switch, and a second contact of said two-position switch being connected in circuit to an electric warning light bulb, a thermal sensing means connected to said two-position electrical switch, said thermal sensing means being a heat sensitive switch having a housing, said housing being immersed in said liquid medium, said heat sensitive switch having two states, said heat sensitive switch being normally open in the first state when the temperature of said liquid medium is below a predetermined heat range and in the second state the heat sensitive switch is closed when the temperature of said liquid medium is above a predetermined heat range, said heat sensitive switch when in said first state causing said two-position electrical switch to be in a first position thereby allowing electric current to flow from a battery, through the "on" position of the "on" position of said ignition switch and said manually operated control switch of the air conditioning system to said electrically operated clutch, so that said compressor is driven, the electric circuit to said light bulb being open when said two-position electrical switch is in the first position, said heat sensitive switch when in said second state causing said two-position electrical switch to be in a second position thereby preventing electric current from flowing to said electric clutch of the compressor, but allowing electric current to flow through said light bulb, so that said electric warning light bulb is lit to indicate that said liquid medium in the engine cooling system is overheating.

2. The motor vehicle air conditioner control and warning system of claim 1 in which the two-position electrical switch is a solenoid.

3. The motor vehicle air conditioner control and warning system of claim 1 in which the two-position electrical switch is a relay.

4. The motor vehicle air conditioner control and warning system of claim 1 in which the heat sensitive switch is electrically connected to an electric coil of the two-position electrical switch.

5. The motor vehicle air conditioner control system of claim 1 in which the electric circuit of the electrically operated clutch of the air conditioner compressor is electrically connected to ground through the two-position electrical switch when the switch is in the first position.

6. The motor vehicle air conditioner control and warning system of claim 1 in which, when said liquid medium subsequently cools down to below the predetermined heat range, said heat sensitive switch reverts to said first state of normally open circuit condition, so that said two-position electrical switch then reverts to said first position thereby breaking the electric circuit to said light bulb and allowing electric current to flow to said electrically operated clutch, so that said compressor is again driven.

7. The motor vehicle air conditioner control and warning system of claim 1 in which the electric circuit of the light is electrically connected to ground through the two-position electrical switch, when the switch is in the second position.

* * * * *